US009202129B2

(12) United States Patent
Krishnamoorthi et al.

(10) Patent No.: US 9,202,129 B2
(45) Date of Patent: Dec. 1, 2015

(54) REDUCING OBJECT DETECTION TIME BY UTILIZING SPACE LOCALIZATION OF FEATURES

(71) Applicant: QUALCOMM Incorporated, San Diego, CA (US)

(72) Inventors: Raghuraman Krishnamoorthi, San Diego, CA (US); Gary G. McGrath, San Diego, CA (US); Bojan Vrcelj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 13/796,444

(22) Filed: Mar. 12, 2013

(65) Prior Publication Data
US 2014/0270344 A1   Sep. 18, 2014

(51) Int. Cl.
*G06K 9/46*   (2006.01)
*G06K 9/62*   (2006.01)
*G06K 9/68*   (2006.01)

(52) U.S. Cl.
CPC ............... *G06K 9/46* (2013.01); *G06K 9/6211* (2013.01); *G06K 9/6857* (2013.01)

(58) Field of Classification Search
CPC ............ G06K 9/00973; G06K 9/4671; G06K 9/4676; G06K 9/6211; G06K 9/6857; G06T 1/20; G06T 2207/20016; G06T 2207/20021
See application file for complete search history.

(56) References Cited

U.S. PATENT DOCUMENTS

| 5,579,444 A | 11/1996 | Dalziel et al. ................... 395/94 |
| 5,768,421 A | 6/1998 | Gaffin et al. ................... 382/209 |
| 6,173,066 B1 | 1/2001 | Peurach et al. ................ 382/103 |
| 6,195,473 B1 | 2/2001 | Zable et al. .................... 382/299 |
| 7,046,404 B2 | 5/2006 | Cheatle et al. .............. 358/909.1 |
| 2011/0222774 A1 | 9/2011 | Hong et al. .................... 382/190 |
| 2012/0002082 A1 | 1/2012 | Johnson et al. ............... 348/234 |
| 2012/0027290 A1 | 2/2012 | Baheti et al. .................. 382/154 |
| 2012/0183224 A1* | 7/2012 | Kirsch ........................... 382/195 |

OTHER PUBLICATIONS

Girod B., et al., "Mobile Visual Search", IEEE Signal Processing Magazine, IEEE Service Center, Piscataway, NJ, US, vol. 28, No. 4, Jul. 1, 2011, pp. 61-76, XP011367629, ISSN: 1053-5888, DOI: 10.1109/MSP.2011.940881.
International Search Report and Written Opinion—PCT/US2014/020898—ISA/EPO—Jul. 15, 2014.
Jalumuri N R., et al., "A study of scanning paths for BWT-based image compression", Jan. 1, 2004, XP055124165, ISBN: 978-0-49-617282-5 Retrieved from the Internet: URL:http://search.proquest.com/docview/305108182 [retrieved on Jun. 18, 2014].

* cited by examiner

*Primary Examiner* — Andrew W Johns
(74) *Attorney, Agent, or Firm* — Blakely Sokoloff Taylor & Zafman, LLP

(57) ABSTRACT

In one example, a method for exiting an object detection pipeline includes determining, while in the object detection pipeline, a number of features within a first tile of an image, wherein the image consists of a plurality of tiles, performing a matching procedure using at least a subset of the features within the first tile if the number of features within the first tile meets a threshold value, exiting the object detection pipeline if a result of the matching procedure indicates an object is recognized in the image, and presenting the result of the matching procedure.

38 Claims, 6 Drawing Sheets

REDUCING OBJECT DETECTION TIME BY UTILIZING SPACE LOCALIZATION OF FEATURES

TECHNICAL FIELD

This disclosure relates to image processing systems and, more particularly, object recognition in images.

BACKGROUND

Visual search in the context of computing devices or computers refers to techniques that enable a computer or other device to provide identifying information for objects in one or more images. Recent interest in visual search has resulted in algorithms that enable computers to identify partially occluded objects and/or features in a wide variety of changing image conditions, including changes in noise and illumination. During this same time, mobile devices that include cameras have emerged, but such mobile devices may have limited user interfaces for entering text or otherwise interfacing with the mobile devices. Developers of mobile devices and mobile device applications have sought to utilize the camera of the mobile device to enhance user interactions with the mobile device.

To illustrate one enhancement, a user of a mobile device may use a camera of the mobile device to capture an image of a given product while shopping at a store. The mobile device may then initiate a visual search algorithm within a set of archived feature descriptors for various images to identify the product based on matching imagery. After identifying the object, the mobile device may then present Augmented Reality (AR) information, and/or present a related non-Augmented reality application. For example, the mobile device can initiate an Internet-based search and present a webpage that contains information about an identified store product.

SUMMARY

An example of a method of exiting an object detection pipeline according to the disclosure includes determining, while in the object detection pipeline, a number of features within a first tile of an image, wherein the image is divisible into a plurality of tiles, performing a matching procedure using at least a subset of the features within the first tile if the number of features within the first tile meets a threshold value, exiting the object detection pipeline if a result of the matching procedure indicates an object is recognized in the image, and presenting the result of the matching procedure.

Implementations of the method may include one or more of the following features. Extracting features from a second tile within the image if the number of features in the first tile does not meet the threshold value. A location of a second tile within the image can be based on a vertical raster pattern, or other predetermined search pattern. The locations of the first and second tiles within the image can be based on an image analysis performed on a downsampled version of the image. Extracting features from an N+1 tile within the image if a cumulative number of features in the N tiles does not meet a threshold value, performing the matching procedure using the features extracted from the N+1 tile and the cumulative features extracted from the N tiles if the number of cumulative features from the N tiles and the N+1 tile meets a threshold value, and exiting the object detection pipeline if a result of the matching procedure using the cumulative features from the N tiles and the N+1 tile indicates an object is recognized in the image. Extracting features from a second tile within the image if the results of the matching procedure do not indicate that an object is recognized. Determining the pose of a recognized object, and extracting features from a second tile within the image if the pose of the recognized object is not geometrically consistent with information in an objects database. The image can be downsampled before the features are extracted from the first tile. The matching procedure may include transmitting the subset of features to a remote device, and receiving the results from the remote device. Determining location statistics based on the extracted features of the first tile, detecting the extracted features on a lower octave version of the image based on the location statistics, and calculating a pose of the object based on the features detected on the lower octave version of the image.

An example of an apparatus for exiting an object detection pipeline according to the disclosure includes a memory unit, a processor configured to determine, while in the object detection pipeline, a number of features within a first tile of an image, wherein the image is divisible into a plurality of tiles, perform a matching procedure using at least a subset of the features within the first tile if the number of features within the first tile meets a threshold value, exit the object detection pipeline if a result of the matching procedure indicates an object is recognized in the image, and store the result of the matching procedure in the memory unit.

An example of an apparatus for exiting an object detection pipeline includes means for determining, while in the object detection pipeline, a number of features within a first tile of an image, wherein the image is divisible into a plurality of tiles, means for performing a matching procedure using at least a subset of the features within the first tile if the number of features within the first tile meets a threshold value, means for exiting the object detection pipeline if a result of the matching procedure indicates an object is recognized in the image, and means for storing the result of the matching procedure.

An example of a computer-readable medium according to the disclosure includes processor-executable instructions configured to cause a processor to determine, while in an object detection pipeline, a number of features within a first tile of an image, wherein the image is divisible into a plurality of tiles, perform a matching procedure using at least a subset of the features within the first tile if the number of features within the first tile meets a threshold value, exit the object detection pipeline if a result of the matching procedure indicates an object is recognized in the image, and store the result of the matching procedure.

An example of a method may include performing a feature extraction process on a first tile in a plurality of spatially offset tiles from an image; performing a matching procedure using at least a subset of features within the first tile if the feature extraction process extracted any features; and determining, before performing the feature extraction process on a second tile in the plurality of spatially offset tiles, whether a result of the matching procedure indicates an object is recognized in the image. In some embodiments, performing the matching procedure comprises transmitting the subset of features to a remote device, and receiving the result from the remote device.

An example of a method may include sequentially analyzing one or more tiles in a plurality of spatially offset tiles from an image. The analyzing of each tile may include performing a feature extraction process on the tile; and determining whether an object is recognizable in the image based on any features extracted from the tile using the feature extraction process and any features extracted from any previously analyzed tiles. The method may further include stopping analysis of any remaining tiles in the plurality of spatially offset tiles in response to determining that the object is recognizable.

In some embodiments, the method further comprises selecting a first tile for the sequentially analyzing. In some embodiments, the first tile comprises a tile at a corner of the image. In some embodiments, the first tile comprises a tile in a central area of the image. In some embodiments, the first tile comprises a tile in a high feature area. In some embodiments, the first tile comprises a tile in an area where an object was previously recognized. In some embodiments, the method further comprises transforming the image into local feature coordinates. In some embodiments, the one or more tiles are sequentially analyzed in a first scale, the first scale is different than a native scale of the image, and the method further comprises determining a pose of the object using the native scale. In some embodiments, the sequentially analyzing comprises sequentially analyzing all of the tiles in the plurality of spatially offset tiles in a first scale of the image, and the method subsequently comprises sequentially analyzing one or more tiles in a plurality of spatially offset tiles in a second scale of the image and stopping analysis of any remaining tiles in the plurality of spatially offset tiles in the second scale when it is determined that the object is recognizable based on features extracted from tiles in the second scale. In some embodiments, the first scale is higher than the second scale. In some embodiments, the sequentially analyzing is sequentially performed for one or more scales in a plurality of scales of the image, and remaining scales are not analyzed after the object is recognized. In some embodiments, the plurality of scales are analyzed in an order from highest scale to lowest scale. In some embodiments, determining whether the object is recognizable comprises transmitting the features extracted from the tile to a remote device, and receiving an indication of whether the object is recognizable from the remote device.

In general, this disclosure describes techniques for object identification in digital images. These techniques may reduce the computational complexity of identifying objects in an image. The techniques of this disclosure provide for keypoint/feature extraction based on a spatial partitioning of an image. Detection can be based on a subset of tiles within an image. Processing only a subset of tiles rather than an entire image may reduce the computational requirements of the detection pipeline. The disclosed spatial partitioning may also be combined with scale based algorithms. Moreover, this disclosure provides techniques for determining the pose of a detected object through the projection of localized detected features to a non-down sampled image of the object.

The details of one or more examples are set forth in the accompanying drawings and the description below. Other features, objects, and advantages will be apparent from the description and drawings, and from the claims.

DETAILED DESCRIPTION

Figure 1A:
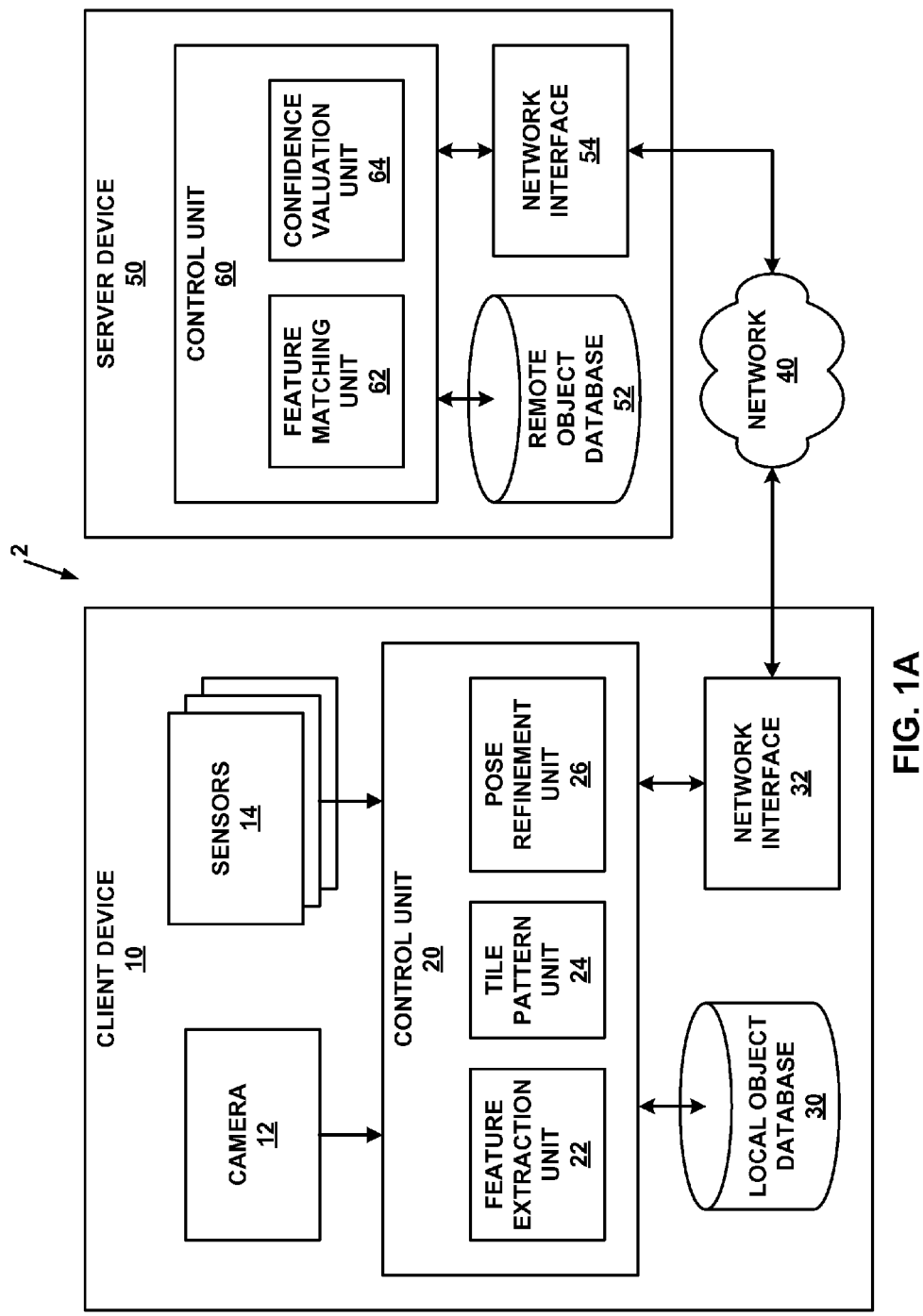
FIG. 1A is a block diagram illustrating an example system in which techniques for spatial based feature extraction may be applied.

In general, this disclosure describes techniques for object identification in images. These techniques may reduce the computational complexity of identifying objects in an image and support an early exit from the object detection pipeline. Rather than extracting feature descriptors after analyzing an entire image, the techniques of this disclosure provide for detecting features within tiles (i.e., subsets of the image). After each tile is processed, the number of detected features can be compared to a threshold value and then compared to an object database. The tiling can be applied to one or more octaves. In general, each octave corresponds to a particular size (e.g., pixel resolution) of the image. For a given octave, the input image may be scaled to a size associated with the resolution. The spatial partitioning techniques described herein can be combined with scale based feature extraction such as described in co-pending U.S. patent application Ser. No. 13/193,294, filed on Jul. 28, 2011.

For object recognition, a database of feature descriptor sets and/or other discriminating information may be derived from training images. Feature descriptors may then be extracted from a target image and used to query the database, to assess the contents of a given query image (i.e., images stored in the database). For augmented reality or visual search applications, the client (for example, a cell phone) may capture an image of an object of interest and compare it against the database of images, features, and/or meta-data information. This database can be stored on a server on the network, and can be retrieved by the client for local processing or alternatively, the query can be transmitted to the server to be processed using network resources. The techniques of this disclosure are generally described with respect to scale invariant feature transform (SIFT) algorithm to perform the localization of keypoints and the extraction of feature descriptors within a tile. Each SIFT feature may have the following attributes: 2D (x, y) feature location, scale at which the feature is detected, the rotational orientation of the feature as given by that of the strongest image gradient in the feature neighborhood, and/or a vector that describes the local pixel variations in a discriminating way, for example a histogram of local image gradients. In some embodiments, feature descriptors may be identified, extracted, and/or localized using a method or algorithm other than SIFT.

Keypoint identification and descriptor extraction can be computationally demanding. For instance, a typical half-size video graphics array (HVGA) image can produce thousands of SIFT features. The implementation of the SIFT algorithm, including the iterative matching process, can outstrip the computational resources available on some mobile platforms. However, in most practical cases, the number of actual feature descriptors that lead to matches with those in the database tend to be much lower than the number of feature descriptors actually calculated. That is, of the set of calculated feature descriptors, a small subset may yield an object identification result. This may be caused, in part, by different imaging conditions in the query image (e.g., illumination, perspective, etc.) affecting feature descriptors such that only a few end up matching with features in the database. The techniques of this disclosure may exploit the spatial reality that keypoints which may be used to identify an object may reside in only a small area of the overall image, and thus reduce the computational requirements of processing the entire image.

FIG. 1A is a block diagram illustrating an example system 2 in which techniques for spatial based feature extraction may be applied. In this example, system 2 includes client device 10 and server device 50, which communicate via network 40. Client device 10, in this example, represents a mobile device, such as a laptop, a so-called netbook, a tablet computer, a personal digital assistant (PDA), a cellular or mobile phone or handset (including so-called "smartphones"), a global positioning system (GPS) device, a digital camera, a digital media player, a game device, or any other mobile device capable of communicating with server device 50. While described in this disclosure with respect to a mobile client device 10, the techniques described in this disclosure are not limited in this respect to mobile client devices. Instead, the techniques may be implemented by any device capable of storing a local object database and/or capable of communicating with server device 50 via network 40 or any other communication medium.

Server device 50 represents a server device that accepts connections, e.g., transmission control protocol (TCP) connections, and responds with its own TCP connection to form a TCP session by which to receive query data and provide identification data. Server device 50 may represent a visual search server device in that server device 50 performs or otherwise implements a visual search algorithm to identify one or more features or objects within an image. While illustrated and described as separate devices, elements and/or functionality of the server device 50 may be included in the client device 10, for example when the client device 10 is configured to identify an object without communicating with the server device 50.

Network 40 represents a public network, such as the Internet, that interconnects client device 10 and server device 50. Commonly, network 40 implements various layers of the open system interconnection (OSI) model to facilitate transfer of communications or data between client device 10 and server device 50. Network 40 typically includes any number of network devices, such as switches, hubs, routers, servers, to enable the transfer of the data between client device 10 and server device 50. While shown as a single network, network 40 may comprise one or more sub-networks that are interconnected to form network 40. These sub-networks may comprise service provider networks, access networks, backend networks or any other type of network commonly employed in a public network to provide for the transfer of data throughout network 40. While described in this example as a public network, network 40 may comprise a private network that is not accessible generally by the public.

As shown in the example of FIG. 1A, client device 10 may include camera 12, sensors 14, control unit 20, local object database 30, and network interface 32. Control unit 20, in this example, includes feature extraction unit 22, tile pattern unit 24, and pose refinement unit 26. Features may be sent from the client device 10 to the server device 50 for processing, and object identifications and/or confidence information (e.g., an indication on whether or not an object is identifiable and/or a confidence of an object identification) may be received from the server device 50. In some examples, control unit 20 may also include units similar to feature matching unit 62 and confidence valuation unit 64 of server device 50. For purposes of example, these units will be discussed with respect to server device 50, though it should be understood that similar units may be included within control unit 20 of client device 10.

Functionality attributed to control unit 20 and control unit 60 and sub-units thereof may be implemented by any combination of hardware, software, and/or firmware. When one or more functions attributed to control unit 20 are implemented in software or firmware, control unit 20 may include one or more computer-readable storage media for storing instructions for the software, as well as one or more hardware-based processing units for executing the software. Such processing units may comprise one or more general purpose processors, application processors, and/or other types of processors. In some embodiments, the computer-readable storage media is internal to at least one of the processing units. Control unit 20 and control unit 60 may additionally or alternatively include one or more hardware units, such as one or more digital signal processors (DSPs), image signal processors (ISPs), general purpose microprocessors, application specific integrated circuits (ASICs), field programmable logic arrays (FPGAs), or other equivalent integrated or discrete logic circuitry. Any or all of the functionality attributed to control unit 20 and control unit 60 may be performed by any respective hardware, software, or firmware thereof. Thus, although separate units are illustrated within control units 20 and 60 in the example of FIG. 1A, it should be understood that in practice, such separate units may be combined in any reasonable fashion or separable into a greater number of modules or components.

Camera 12 may include a two-dimensional array of individual image sensor elements, e.g., arranged in rows and columns. Camera 12 may comprise, for example, an array of solid state sensor elements such as complementary metal-oxide semiconductor (CMOS) sensors, or other sensor elements. The image sensor elements within camera 12 are exposed to a scene to obtain light information from the scene and to capture a digital image of the scene. The digital image may include a two-dimensional matrix of pixel values, which may be defined in a particular color space, e.g., having red-green-blue values, or pixel luminance (intensity or brightness) values and pixel chrominance (color) values.

Sensors 14 may include one or more environmental sensors that provide information to control unit 20. Control unit 20 may use this information to approximate a scale for an object in an image captured by camera 12. In some examples, sensors 14 may include a satellite positioning system (SPS) unit such as a global positioning system (GPS) unit that interacts with GPS satellites to determine a geographic location of client device 10. The GPS unit in combination with other sensors 14 may also provide an indication of a direction in which camera 12 was pointed when the image was captured. Control unit 20 may use this location and direction information to limit the search to potential objects that could be in the line of sight of camera 12.

For example, remote object database 52 may store geographic locations for objects of remote object database 52. When the GPS unit of sensors 14 determines a geographic location and direction of camera 12, control unit 20 may retrieve a subset of data from remote object database 52 having geographic locations in the line of sight of camera 12 or nearby areas and store the retrieved data in local object database 30. Feature extraction unit 22 may then extract feature descriptors from the image and query local object database 30 with these extracted feature descriptors.

As another example, feature extraction unit 22 may use the geographic location direction to approximate an initial scale of objects in the line of sight of camera 12. For example, remote object database 52 may store a most likely scale for objects in the geographic location near client device 10 and in the line of sight of camera 12, based on the location of client device 10 determined by the GPS unit of sensors 14. Feature extraction unit 22 may then initially extract feature descriptors from tiles using this initial scale and send a query to server device 50 via network 40, to query remote object database 52. The query may include the location information, in addition to the feature descriptors, in some examples.

Other examples of sensor may include, for example, temperature sensors, pressure sensors (e.g., barometric sensors), light sensors, infrared sensors, ultraviolet sensors, humidity sensors, carbon dioxide ($CO_2$) sensors, or other such environmental sensors, any or all of which may provide values for respective sensed values. Control unit 20 may include data ranges for any or all of these sensors indicative of indoor and outdoor environments. Control unit 20 may compare current values for any or all of the sensors to the corresponding data ranges to determine whether client device 10 was indoors or outdoors when camera 12 captured a query image.

Feature extraction unit 22 represents a unit that performs feature extraction in accordance with a feature extraction algorithm, such as a scale invariant feature transform (SIFT) algorithm, a compressed histogram of gradients (CHoG) algorithm, or other keypoint or feature description extraction algorithms. Generally, feature extraction unit 22 operates on image data, which may be captured locally using camera 12 or other image capture device included within client device 10. Alternatively, client device 10 may store image data without capturing this image data itself, e.g., by downloading the image data via network 40, locally via a wired connection with another computing device or via any other wired or wireless form of communication.

Tile pattern unit 24 represents a unit that determines a tile processing order in an image captured by, e.g., camera 12. For example, for a given scale, the tile pattern unit 24 may determine the initial location for the first tile (i.e., starting tile) and the location of subsequent tiles. The tile pattern unit 24 can determine the tile order based on the potential keypoints detected in an initial octave. The tile pattern unit 24 can be configured to prioritize the spatial layout of an image such that the portions of the image that contain features (e.g., potential keypoints) can be processed first. The coarse location of features can determined by processing an image at a higher scale (e.g., down sampled) and performing a localization algorithm (e.g., SIFT).

In accordance with the techniques of this disclosure, feature extraction unit 22 may process an initial tile corresponding to a preconfigured pattern (e.g., raster scan), or as determined by the tile pattern unit. The feature extraction unit 22 may extract feature descriptors using keypoints extracted from a tile. Then, control unit 20 may determine whether an identity of an object in the query image can be determined using only these feature descriptors, and if not, proceed to extract feature descriptors for a subsequent tile.

The pose refinement unit 26 represents a unit that determines a pose of an object. In general, the detection of keypoints and the determination of features can be accomplished with high octaves while determining the pose of an object based on processing of a lower octave. The pose refinement unit 26 can be configured to utilize a Normal Cross-Correlation (NCC), or other feature tracking technique, to process a neighborhood within a tile at a lower octave (e.g., the native octave) to provide a fine pose of the feature descriptor. The corresponding pose information can be used to refine the search for the query image.

As explained below, network interface 32 may comprise a wireless network interface. When network interface 32 includes a wireless network interface, the wireless network interface may implement one or more wireless network protocols, such as one or more of the IEEE 802.11 standards (e.g., 802.11 a/b/g/n), the Third Generation Mobile Telecommunications (3G) standards, the Fourth Generation telecommunications standards (which may include mobile Worldwide Interoperability for Microwave Access (mobile WiMAX), 3G Long Term Evolution (LTE), LTE Advanced, and WirelessMAN-Advanced (IEEE 802.16)), or other wireless network protocols. In general, if a wireless network is available, control unit 20 may determine that it is highly likely that client device 10 is indoors. When client device 10 is indoors, control unit 20 may determine that sizes of objects in an image captured by camera 12 are likely to be relatively small. Accordingly, feature extraction unit 22 may be configured to treat whether a wireless network is available as a factor in determining a starting octave from which to extract feature descriptors for a query image.

In the example of FIG. 1, server device 50 stores remote object database 52, while client device 10 stores local object database 30. Client device 10 may retrieve data for local object database 30 from server device 50 via network 40. Accordingly, local object database 30 may represent all or a portion of remote object database 52. In some examples, local object database 30 may include data from remote object database 52 as well as data from other remote object databases of other server devices (not shown in FIG. 1A). In general, the techniques of this disclosure may query either or both of local object database 30 and/or remote object database 52 to determine an identity of an object in an image.

As described in greater detail below, feature extraction unit 22 may extract keypoints from various sets of filtered images based on the original image. In some examples, the original image may be filtered using Gaussian filters to produce a set of Gaussian-blurred images. While it should be understood that various filtering techniques may be applied, this disclosure will primarily focus on Gaussian filters as an example. However, other filtering techniques may also be applied without departing from the techniques of this disclosure. Further, feature extraction unit 22 may process unfiltered images in some embodiments. In general, each of the filtered images in one set may have a similar size (e.g., in terms of pixel resolution), where each image in the set may be progressively more filtered. Each of the sets may be referred to as an "octave." Gaussian blurring generally involves convolving the image data for a particular octave with a Gaussian blur function at a defined scale. Feature extraction unit 22 may incrementally convolve the image data, where a fixed multiplicative factor, referred to by the variable sigma ($\sigma$), increments consequent Gaussian filters within the octave. Feature extraction unit 22 may form what may be referred to as a "Gaussian pyramid" having each of the Gaussian-blurred images for a particular octave. Feature extraction unit 22 may then compare two successively stacked Gaussian-blurred images in the pyramid to generate difference of Gaussian (DoG) images. The DoG images may form what is referred to as a "DoG space."

Based on this DoG space, feature extraction unit 22 may detect keypoints, where a keypoint refers to a region or patch of pixels around a particular sample point or pixel in the image data that is potentially interesting from a geometrical perspective. Generally, feature extraction unit 22 identifies keypoints as local maxima and/or local minima in the constructed DoG space. Feature extraction unit 22 may then assign these keypoints one or more orientations, or directions, based on directions of a local image gradient for the patch in which the keypoint was detected. To characterize these orientations, feature extraction unit 22 may define the orientation in terms of a gradient orientation histogram. Feature extraction unit 22 may then define a feature descriptor as a location and an orientation (e.g., by way of the gradient orientation histogram). After defining the feature descriptor, feature extraction unit 22 may output the feature descriptor, e.g., by querying local object database 30 or remote object database 52 with the feature descriptor. Feature extraction unit 22 may output a set of feature descriptors using this process.

Network interface 32 represents any type of interface that is capable of communicating with server device 50 via network 40, including wireless interfaces and wired interfaces. Network interface 32 may represent a wireless cellular interface and include the necessary hardware or other components, such as antennas, modulators and the like, to communicate via a wireless cellular network with network 40 and via network 40 with server device 50. In this instance, although not shown in the example of FIG. 1A, network 40 includes the wireless cellular access network by which wireless cellular network interface 32 communicates with network 40. Although not illustrated in FIG. 1A, client device 10 may further include a display, e.g., any type of display unit capable of displaying images, such as the image data in which object identities are determined, or any other types of data. The display may, for example, comprise a light emitting diode (LED) display device, an organic LED (OLED) display device, a liquid crystal display (LCD) device, a plasma display device, or any other type of display device.

Server device 50 includes network interface 54, remote object database 52, and control unit 60. Control unit 60, in this example, includes feature matching unit 62 and confidence valuation unit 64. Network interface 54 may be similar to network interface 32 of client device 10, in that network interface 54 may represent any type of interface capable of communicating with a network, such as network 40. Feature matching unit 62 represents a unit that performs feature matching to identify one or more features or objects in the image data based on feature descriptors received from client device 10.

Feature matching unit 62 may access remote object database 52 to perform this feature identification, where remote object database 52 stores data defining feature descriptors and associates at least some of the received feature descriptors with identification data identifying the corresponding feature or object extracted from the image data. Confidence valuation unit 64 determines a confidence value, representative of a confidence that the object identified as corresponding to the received feature identifiers is the actual identity of the object in the image data.

Objects stored in remote object database 52 may include a plurality of feature descriptors, and the feature descriptors received from client device 10 may match only a subset of the feature descriptors of an object in remote object database 52. In general, the confidence value represents a correspondence between matches between the received feature descriptors and the feature descriptors associated with a corresponding object. Thus, a higher confidence value may reflect that the received feature descriptors match a relatively large number of feature descriptors of the object stored by remote object database 52, while a lower confidence value may reflect that the received feature descriptors match a relatively small number of feature descriptors of the object stored by remote object database 52.

After determining an identity of an object for feature descriptors received from client device 10, feature matching unit 62 provides identification data representative of the determined identity. Likewise, confidence valuation unit 64 assesses the confidence that the determined identity properly matches the received feature descriptors, generates a corresponding confidence value, and provides the confidence value to client device 10. Client device 10 may determine whether the confidence value exceeds a threshold, and if not, extract additional feature descriptors from further octaves for the image data and send these additional feature descriptors to server device 50 for further analysis.

Initially, a user of client device 10 may interface with client device 10 to initiate a visual search. The user may interface with a user interface or other type of interface presented by a display of client device 10 to select the image data and then initiate the visual search to identify one or more features or objects that are the focus of the image stored as the image data. For example, the image data may correspond to an image of a piece of famous artwork. The user may have captured this image using camera 12 of client device 10, downloaded this image from network 40, or locally retrieved the image via a wired or wireless connection with another computing device. In any event, after selecting the image data, the user may initiate the visual search, in this example, to identify the piece of famous artwork by, for example, name, artist and date of completion. In some embodiments, the visual search is automatically initiated upon an image being captured by the camera 12, for example when the device is executing certain embodiments of an augmented reality application.

In response to initiating the visual search, client device 10 invokes feature extraction unit 22 to extract at least one the feature descriptor describing one of the keypoints found through analysis of the image data. Control unit 20 may query local object database 30 using the feature descriptor and/or send the feature descriptor to server device 50 via network 40 to query remote object database 52 using the feature descriptor. In some examples, feature extraction unit 22 forwards the feature descriptor to a feature compression unit (not shown in this example), which may compress the feature descriptor prior to transmission of the feature descriptor via network 40. When sent to server device 50, control unit 20 may encapsulate the feature descriptor (which may be compressed prior to encapsulation) as a network packet, e.g., a TCP/IP packet.

While various components, modules, or units are described in this disclosure to emphasize functional aspects of devices configured to perform the disclosed techniques, these units do not necessarily require realization by different hardware units. Rather, various units may be combined in a hardware unit or provided by a collection of interoperative hardware units, including one or more processors as described above, in conjunction with suitable software and/or firmware stored to computer-readable mediums. In this respect, reference to units in this disclosure is intended to suggest different functional units that may or may not be implemented as separate hardware units and/or hardware and software units.

As discussed above, feature extraction unit 22, in accordance with the techniques of this disclosure, may be configured to sequentially extract feature descriptors from an image captured by camera 12. That is, feature extraction unit 22 may extract feature descriptors from a first tile, determine whether those feature descriptors can be used to accurately determine the identity of an object in the image, and if not, extract feature descriptors from one or more subsequent tiles. Different tiling patterns can be used within different octaves.

Feature attributes from training images or test images may be used to reduce complexity in feature generation and matching. These statistics may be used to initialize parameters involved in the feature extraction process. Once initialized, feature extraction unit 22 may incrementally extract features, perform recognition and/or inference, and if the recognition is not sufficient for reliable decisions as to the identity of the object in the image, update the feature extraction parameters for a next set of feature extractions. Using training data (which may be stored in local object database 30 and/or retrieved from remote object database 52) and past query statistics, recognition of objects in a query image may be achieved in fewer steps, which may result in a computational savings.

The techniques of this disclosure may provide one or more advantages. For example, these techniques may provide faster, localized extraction of feature descriptors, e.g., for SIFT, than SIFT would otherwise achieve. These techniques may allow for estimation of a most relevant subset of scale-space levels (e.g., octave levels) for processing, which may improve speed and complexity of object recognition. These techniques may further allow faster searching in local object database 30 of client device 10 (e.g., a mobile phone). That is, these techniques allow feature descriptor extraction from upper levels first, and stopping the algorithm when sufficient accuracy is reached. In this manner, there may be a relatively short response in a distributed visual search system, such as system 2 of FIG. 1A. Feature descriptors may be transmitted via network 40 to server device 50 progressively, starting with upper levels first, and server device 50 may perform several iterations of searches on received data and send results or a termination signal back once sufficient accuracy match is found. Client device 10 may stop sending feature descriptors to server device 50 after results of the search or the termination signal is received.

Figure 1B:
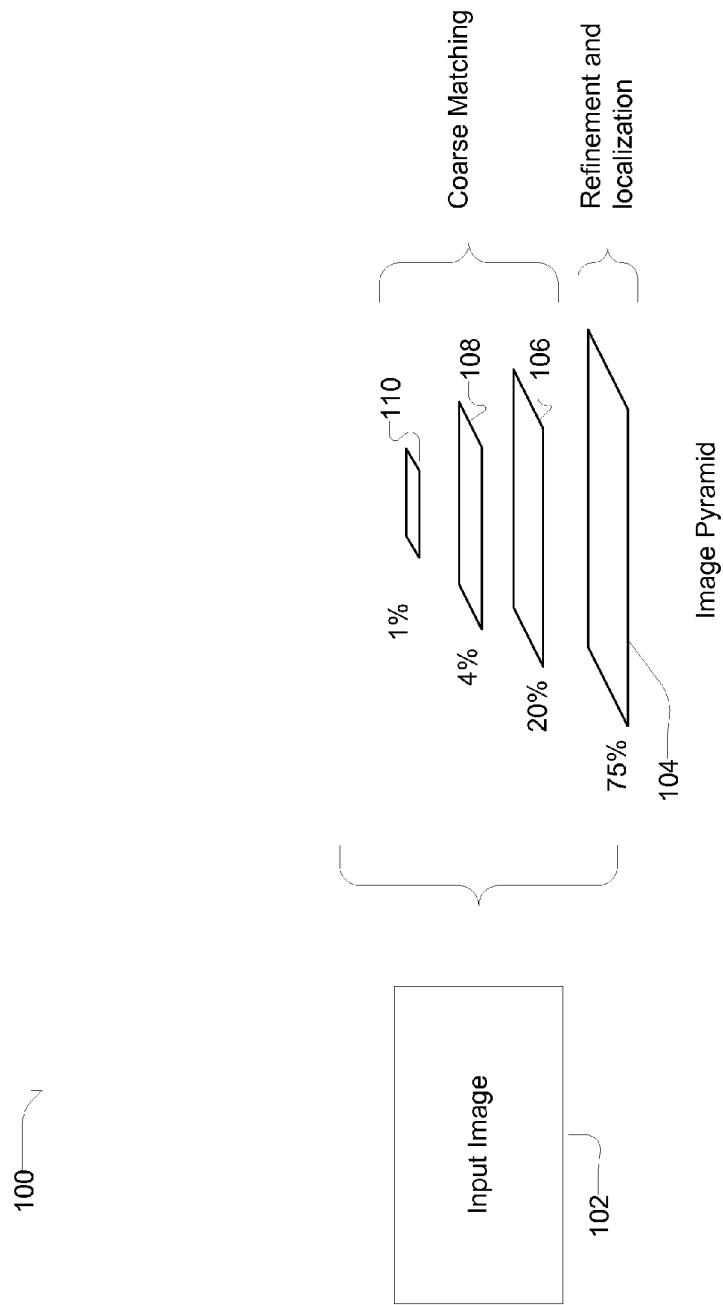
FIG. 1B is a conceptual diagram of an image pyramid with four orders.

Referring to FIG. 1B, a conceptual diagram 100 of an image pyramid with four orders is shown. The diagram 100 is provided to illustrate the concept of scale and highlight how an input image 102 can be processed in varying resolution octaves. For example, each of the depicted octaves 104, 106, 108, 110 represent the image 102 in sequentially reducing resolution (e.g., 75%, 20%, 4%, 1%). The native image 102 is considered the zero order image and the subsequent images in the pyramid are considered higher orders, or higher octaves. As the order (e.g., scale, octave) of an image increases, the resolution and corresponding memory requirements decrease. The higher order images, 106, 108, 110 can be used for coarse matching of keypoints. Processing at the higher octaves preserves computation power of the client device 10. Portions of the lower order images 104, and the zero order image 102, may be used by the pose refinement unit 26 to determine the pose of an object.

Figure 2:
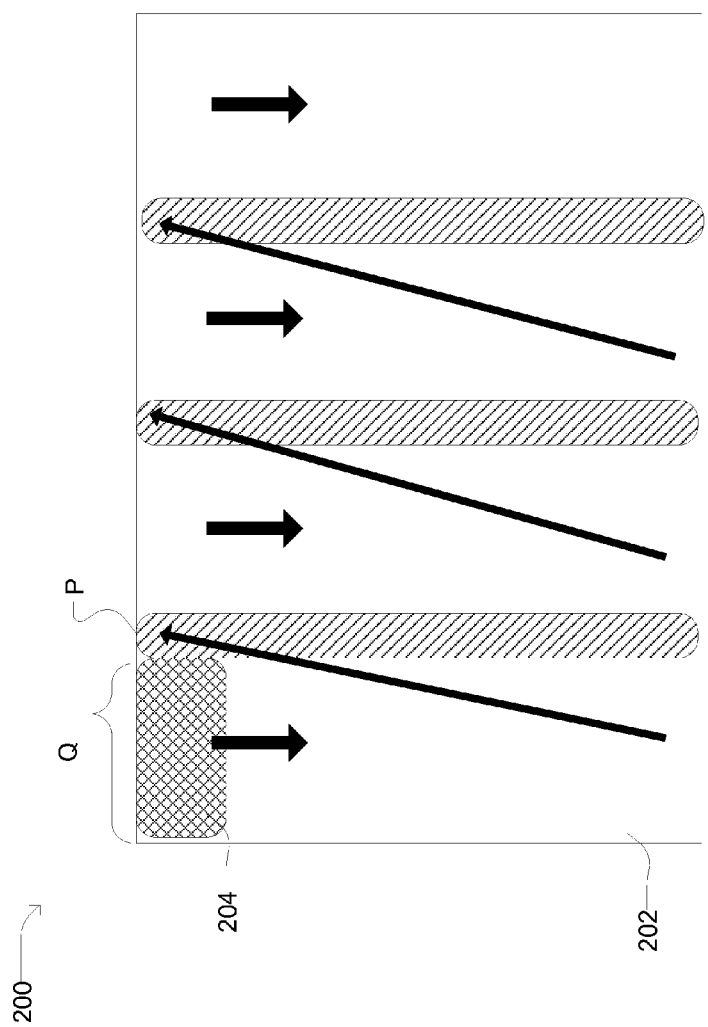
FIG. 2 is a conceptual diagram illustrating the processing of tiles in an image in a raster scanning pattern.

Referring to FIG. 2, a conceptual diagram 200 illustrating the processing of tiles in an image in a raster scanning pattern is shown. The diagram 200 includes an image area 202 and a region of interest 204, also referred to as a tile or a neighborhood. The tile pattern unit 24 is configured to receive the image area 202 and determine an initial area of interest 202, and the corresponding scan pattern. For example, the region of interest 204 can be of a width 'Q,' with a corresponding area of overhead 'P.' The feature extraction unit 22 may extract keypoints in consideration of the tile 204 (e.g., an area defined by (x,y) with +/− delta). That is, the keypoints are extracted in a local neighborhood, and the neighborhoods are processed one at a time. The image 202 is processed sequentially such that tiles 204 are processed one at a time. This technique is generally referred to herein as tiling or striping. The term tile can be considered a neighborhood of the image which is currently being processed. Generally, a tile 204 is a region of interest within (e.g., a subset of) the image 202. The image 202 can be the zero order, or a higher order representation. The size of the tile 204 can remain constant and thus cover a larger portion of the image in the higher orders. The tile pattern unit 24 can move, or scan, the tile 204 across the image 202. For example, the illustration 200 shows a vertical raster scan where the tile 204 advances vertically down an image sub-region (e.g., a stripe). When the lower-most location in the sub-region is reached, the tile is advanced to the next stripe starting at the top of the image area 202 and beginning of the first overlap region P. The process can be repeated for the entire image 202.

The capabilities of the feature extraction unit 22 may establish the dimensions 'Q' and 'P.' The size of the tile 204 can be based on the processing and filtering power available in the mobile device 10. 'P' represents the overhead required for the image processing. It may be beneficial to process the tiles without using large amounts of memory. In an example, the feature extraction unit 22 convolves two sequences (e.g., a filter and an input sample). In this example, the tile 204 is a local neighborhood of the input image processed at any given time. The vertical size of a tile may be based on the size of the longest filter operating on a neighborhood. The horizontal side of the tile ('Q', or 'P+Q') may be longer in order to minimize the relative processing overhead P/Q. As an example, the longest filtering operation on the input image for extracting features can be 25 samples long—this would be a combination of filters needed to perform local smoothing, local differences, and extrema search. In this example, the size of the tile 204 may be 100 pixels in the horizontal, and 25 pixels in the vertical. The overhead P is approximately 25. The resulting output of processing the first tile location would be a smaller row of approximately 75 pixels (e.g., equal to 100−25), and only one pixel in height. These can be the potential feature locations (e.g., they need not be feature locations). The next row of 75 pixels can be processed in the second location of the tile immediately below the first location. The vertical raster scan is exemplary only, and not a limitation as the scan pattern can be chosen deterministically, can be based on the current scale, and/or may attempt to maximize the local (e.g., cached) memory reuse when processing consecutive tile locations, for example.

While it is possible to keep the vertical size of the tile larger than the minimum value (e.g., 25 in the above example), it may not provide a benefit from the processing overhead point of view, and may result in a need to increase the local cache minimum size). If the vertical dimension is only 25 as in the above example, all the features extracted during the first tile location would lay approximately on the same row of 75 pixels which are first processed. Sliding the tile downwards could amass more features which are all located within the first stripe 202. When the tile reaches the bottom of the first stripe, all the features contained in 202 have been extracted and encrypted in descriptors. The size and shape of a tile may vary and/or be modified, for example based on the design of the filter, processing capabilities, and/or available cache memory.

Figure 3:
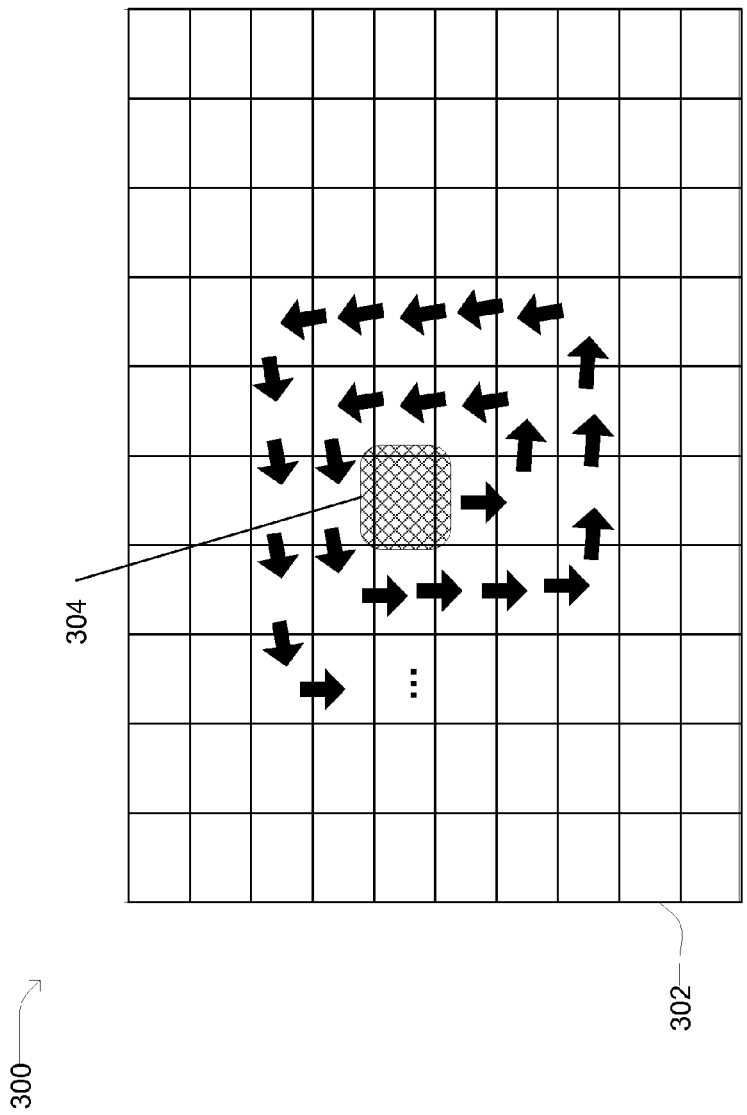
FIG. 3 is a conceptual diagram illustrating the processing of tiles in an image according to an expanding circle pattern.

Referring to FIG. 3, with further reference to FIG. 2, a conceptual diagram 300 illustrating the processing of tiles in an image according to an expanding circle pattern is shown. The diagram 300 includes and image 302 and an area of interest 304. As discussed above, the dimensions of the area of interest 304 can be based on the processing power available to the mobile device 10. In this example, the tile pattern unit 24 can begin the tiling process at a location within the image 302, and determine that additional tiles can be processed in an expanding circle pattern. It is recognized that this processing pattern may not be the most efficient use of processing power, but the pattern is exemplary only, and not a limitation, as the tile pattern unit 24 can be configured to utilize other patterns. In an embodiment, the tile pattern unit 24 can select an initial tile based on a heavily downsampled version of the image. That is, the location of a feature in the downsampled image can be used as the initial location of a scan at a lower octave version of the image. The search pattern can be based on one or more features in the downsampled image. For example, an area around a first feature can be processed, and then the area around a second feature can be processed. Additional features can be processed in a sequential order. The tile pattern unit 24 can include other patterns and criteria directed to the sequence and location of tiles to be processed. The location of the initial tile may be based on a relative location within an image (e.g., center, top left, lower right), or based on an area identified by a user such as where a user touches, or otherwise activates a display. The initial tile may be based on location services information such as identifying a geo-referenced area of the display based on the location and orientation of the client device 10. In an embodiment, the initial tile may be selected based on image related variables such as focal length, zoom factor, and contrast. For example, a wide angle may indicate that the initial tile should be located on the boundaries of the image, while a higher zoom factor may indicate that the initial tile should be in the center of the image. In some embodiments, the initial tile and/or an initial scale may be determined based on a location within a previous image or a scale of the previous image where an object or features were detected or identified. Other variables associated with the client device and the image may be used to determine an initial tile.

Figure 4:
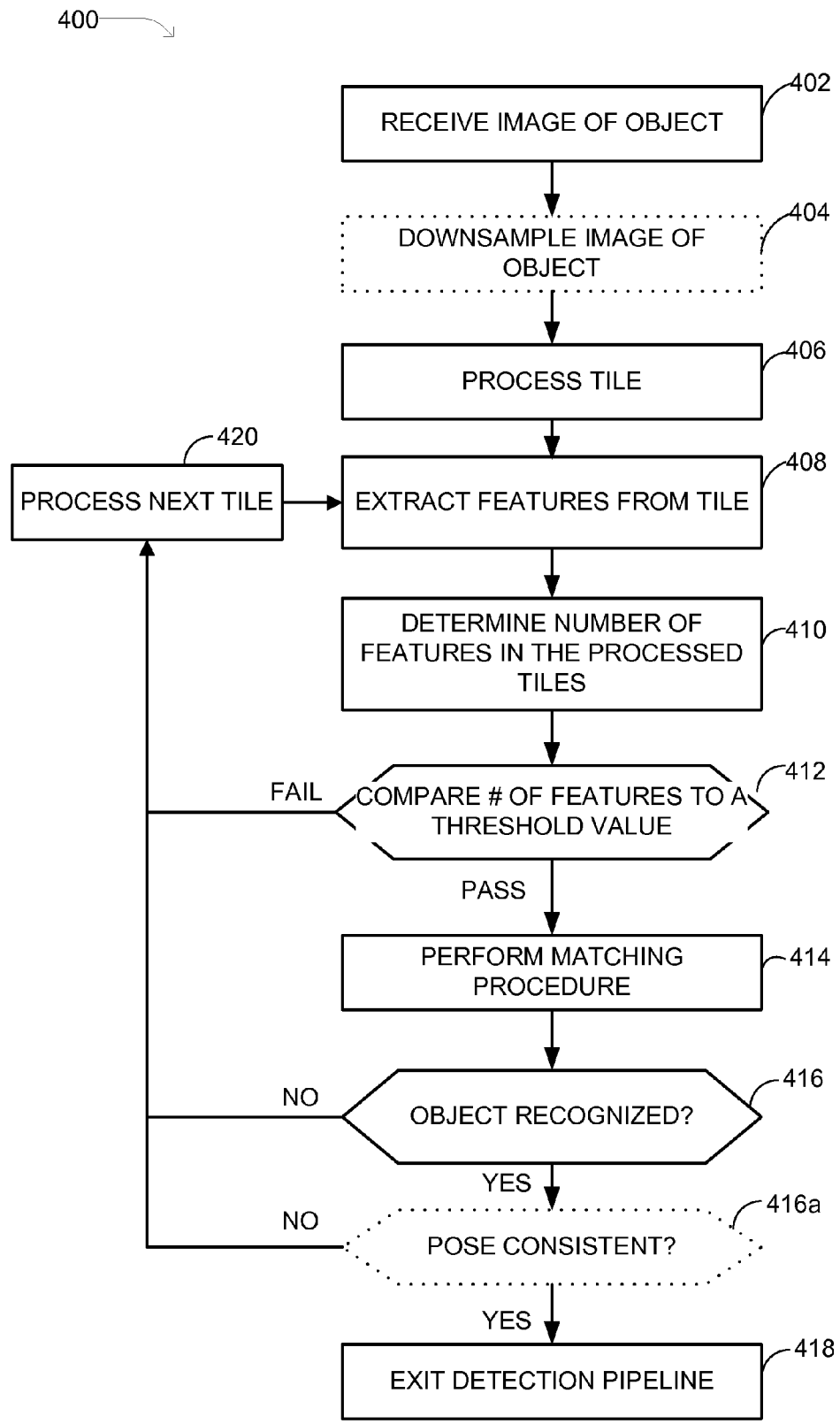
FIG. 4 is a flowchart illustrating an example method for performing an early exit from a detection pipeline based on spatial processing of an image.

In operation, referring to FIG. 4 with further reference to FIGS. 2 and 3, a flowchart illustrating an example process 400 for performing an early exit from a detection pipeline based on spatial processing of an image using the system 2 is shown. The process 400, however, is exemplary only and not limiting. The process 400 may be altered, e.g., by having stages added, removed, or rearranged. FIG. 4 is described with respect to the components of the client device 10. It should be understood, however, that the method of FIG. 4 may be performed by other devices, or performed jointly by various devices. For example, control unit 60 of the server device 50 (FIG. 1A) may be configured to perform the method of FIG. 4.

In general, the process 400 may shorten the time required to detect an object in an image. The detection time can depend on location and nature of the keypoints within the image 202. The feature extraction unit 24 includes extraction algorithms to extract features from a tile 204, and the control unit 20 provides the extracted features in the form of a query that relates features to one another based on connecting geometries. These features and geometries can be compared to reference images that are stored in one or more object databases 30, 52 with features that were extracted in a similar manner. The objective is to compare the features and the underlying geometry connecting the features from the query image to the images in the database to find the closest match. The process 400 may be performed on the zero order image directly, and/or it may be performed on higher order images. In an embodiment, a higher order image can be processed according to the process 400 to determine the position of the initial tile and/or the raster scan pattern to be used on a lower order image. In some embodiments, after the initial tile and/or raster scan pattern to be used is determined, the lower order image is processed according to the process 400 using the determined initial tile and/or raster scan pattern.

At stage 402, the control unit 20 receives an image of an object. For example, the camera 12 can capture an image 202 of an object and the control unit 20 receives the image via a camera mode, or from a previously stored image file. At stage 404, the feature extraction unit 22 can select an octave or downsample the received image to a lower scale (i.e., higher order) to begin the processing. Stage 404 is optional as the process 400 can be utilized on the zero octave of an image. The higher octaves (i.e., the downsampled images) may be sufficient for feature recognition and can provide feature localization information to assist processing at the lower octaves.

At stage 406 the tile pattern unit 24 can determine an initial tile 204 to be processed. In an embodiment, the initial tile can be in the upper left corner of the image 202 and subsequent tiles can be processed in a raster scan pattern. In another embodiment, referring to FIG. 3, an initial tile 304 can be based on a low complexity search of a heavily downsampled image, and additional tiles can be processed in a lower order image in accordance with a tile processing pattern. The tile processing pattern need not be in a sequential and continuous order as depicted in FIG. 3 as tiles can be processed in any order or sequence.

After determining an initial tile (e.g., 204, 304), the feature extraction unit 22 may extract keypoints from the initial tile. The feature extraction unit may apply algorithms configured to extract the features, and corresponding geometries of a tile. In an embodiment, the feature extraction module 22 processes a single tile and then the control unit 20 determines if there is a feature match in a database (e.g., either the local object database 30, or the remote object database 52) before moving to the next tile in the sequence (e.g., in the raster scan, the expanding circle, or other patterns). For example, at stage 408 the feature extraction unit 22 can utilize feature detection algorithms such as Gaussian blur filtering to extract features from the tile. At stage 410, the feature extraction unit 22 can determine a count of the features extracted in the tile 204, if any, and keep a running total of the features extracted for every tile processed. In general, the total number of extracted features can grow linearly as the tile is advanced from the initial position onwards, and all of the cumulative features are considered when forming a matching query. For example, the feature extraction unit 22 may iterate through N number of tiles and store the cumulative total of detected features in the N number of tiles.

At stage 412, the feature extraction unit 22 can compare the count features detected for the processed tiles to a threshold value. If a sufficient number of features are detected (e.g., 3, 4, 5, 10, 15, 50), then the control unit 20 can execute a matching procedure at stage 414. For example, the detected features and the corresponding geometries can be compared to the features stored in one or more of the objects databases 30, 52. If the control unit 20 determines the object is recognized at stage 416, the detection pipeline may be exited at stage 418. In an embodiment, the process 400 may continue until the number of objects recognized meets a predetermined threshold value (e.g., 1, 2, 5, 10 objects). The predetermined threshold may be, for example, established by an Augmented Reality application executing on the client 10. The results of the object detection (i.e., matching procedure) can be presented to a user, or another application. For example, the results of the matching procedure can be displayed as text or an augmentation on the client device, or presented to another local or remote application (e.g., Web service) via the network 40. In an embodiment, the results of the matching procedure can be stored in memory for subsequent access by an application.

In an embodiment, when an object is recognized at stage 416, at optional stage 416a the pose refinement unit 26 is configured to determine if the pose of the object is geometrically consistent with information in the object databases 30, 52. For example, the pose refinement unit 26 can attempt to refine the pose of the object based on the lowest octave. If the pose refinement information is not geometrically consistent, then process 400 can determine that the object is not recognized. The pose refinement step 416a can add a safe-guard against false positives found in higher octave searches. If an object is not recognized, the pose information is not geometrically consistent, or the number of features is not sufficient, then the next tile in the sequence can be processed at stage 420.

In some embodiments, an octave other than the native octave is first processed according to the process 400 and if a threshold number of objects are not recognized and/or the pose of the threshold number of objects are not geometrically consistent, then a lower octave may be processed according to the process 400. In some embodiments, a first octave (e.g., the highest octave) is selected, and lower octaves are sequentially processed according to the process 400 until the threshold number of objects are recognized and geometrically consistent, at which time the process 400 may exit the detection pipeline.

Figure 5:
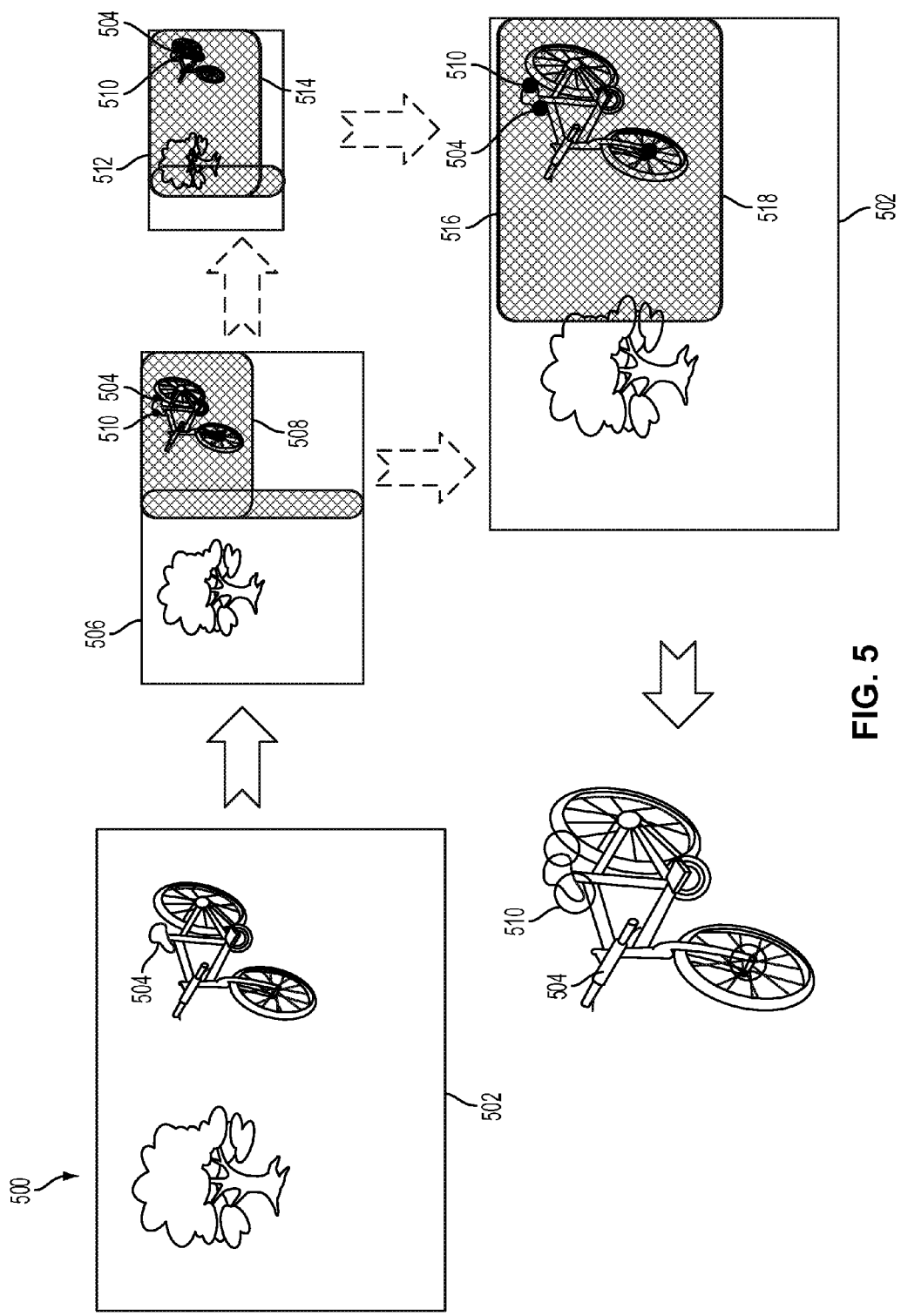
FIG. 5 is a conceptual diagram illustrating an early exit after scale and spatial image processing.

Referring to FIG. 5, a conceptual diagram 500 illustrating an early exit after scale and spatial image processing is shown. The diagram 500 includes a low octave image 502 (e.g., the zero or native octave) which represents a camera view, or image file, captured by the mobile device 10. The image 502 includes an object of interest 504 (i.e., the bicycle) located in the upper half of the image. The feature extraction unit 22 is configured to generally detect an area within the image 502 which may contain features, and the tile pattern unit 24 can be configured to select an area for an initial tile location. The feature extraction unit 22 may also determine a scale for the initial tile. As depicted in the image 502, the objects are located in the top half of the image 502, and there may be little reason to process tiles in the bottom half of the image. The tile pattern unit 24 determines a scan pattern. In an example, the first tile 508 can be located in a heavily down-sampled octave image 506 (e.g., using approximately 1%, 5%, 10%, or 15% of the pixels of the zero octave image 502). In general, the image 506 is a higher octave than the image 502 in some embodiments. The original image 502 can be described as the lowest (or native) scale/octave. In an example, image 506 can be approximately ¼ of the size of image 502 (i.e., ½ in each dimension), and is called the first octave (i.e., one octave higher than the original image). The image 512 is another higher octave and is provided to demonstrate that the tiling process can implemented in different octaves. For example, the image 512 can be approximately ¹⁄₁₆ the size of the original image 502 (i.e., ¼ in each dimension). The feature extraction unit 22 can perform a low complexity feature search in the neighborhood 514. The control unit 20 can run local statistics and the location of objects of interest 504 can be stored. For example, the location can identify a sub-region of the image. The sub-region can be defined as (x1, y1) and (x2, y2), and the tiling can occur within the sub-region.

In operation, the feature extraction unit 22 is configured to process the higher octave images 506, 512 (i.e., the heavily down-sampled images) and perform coarse level matching. For example, the feature extraction unit 22 can initially detect features 510 and the associated geometries in the second (or higher) octave image 512. If the results of the coarse matching are not successful using the second octave image 512, then the feature extraction unit 22 is configured to process a lower octave image (e.g., the first octave image 506). In general, an output of the feature extraction unit 22 is an indication on whether or not a target object in the camera view 502 is an object of interest (e.g., correlates with information in one of the object databases 30, 52).

As discussed, the feature extraction unit 22 can process the high octave images 506, 512 to determine whether the features 510 represent an object of interest 504. The pose refinement unit 26 is configured to process a tile from a lower octave image 516 to determine the pose of the object. For example, the lower octave 516 may be in the pixel level domain (e.g., the native octave 502). In general, higher octave images (e.g., 506, 512) are the more heavily downsampled octaves. The higher octave image 512 may be generally sufficient to determine a rough location of the object 504. For example, the feature extraction unit 22 is configured to identify the area 518 based on the rough location processing of the downsampled image 512. The pose refinement unit 26 is configured to process area 518, which includes the features 510 of the object 504, to determine the fine pose of the object 504. In an embodiment, the pose refinement unit 26 utilizes a coarse homography projection on the estimated location of the object from the downsampled image 512 to perform a local search in the area 518 of the lower octave image. The pose refinement unit 26 may perform the local search for pose refinement in the original resolution (e.g., octave 0) using Normalized Cross-Correlation (NCC) or other inexpensive feature tracking technique. The size of the area 518 may be based on the octave used to detect the object features 510. For example, if the first octave image 506 is used for the coarse localization, then the area 518 may be four times the size of the tile 508. Similarly, if the tile 514 is used for the coarse localization, then the size of the area 518 will be sixteen times the size of tile 514. The size and proportion of the tiles are exemplary only, and not a limitation as other sizes and proportions may be used.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, tangible computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of exiting an object detection pipeline, the method comprising:
    determining, while in the object detection pipeline, a number of features within a first tile of an image, wherein the image is divisible into a plurality of tiles;
    performing a matching procedure using at least a subset of the features within the first tile if the number of features within the first tile meets a threshold value;
    exiting the object detection pipeline if a result of the matching procedure indicates an object is recognized in the image; and
    presenting the result of the matching procedure.

2. The method of claim 1 further comprising extracting features from a second tile within the image if the number of features in the first tile does not meet the threshold value.

3. The method of claim 2 wherein a location of a second tile within the image is based on a vertical raster pattern.

4. The method of claim 2 wherein a location of the second tile within the image is based on a predetermined search pattern.

5. The method of claim 2 wherein locations of the first and second tiles within the image are based on an image analysis performed on a downsampled version of the image.

6. The method of claim 2 further comprising:
    extracting features from an N+1 tile within the image if a cumulative number of features in the N tiles does not meet a threshold value;
    performing the matching procedure using the features extracted from the N+1 tile and the cumulative features extracted from the N tiles if the number of cumulative features from the N tiles and the N+1 tile meets a threshold value; and
    exiting the object detection pipeline if a result of the matching procedure using the cumulative features from the N tiles and the N+1 tile indicates an object is recognized in the image.

7. The method of claim 1 further comprising extracting features from a second tile within the image if the results of the matching procedure do not indicate that an object is recognized.

8. The method of claim 1 further comprising determining the pose of a recognized object, and extracting features from a second tile within the image if the pose of the recognized object is not geometrically consistent with information in an objects database.

9. The method of claim 1 wherein the image is downsampled before the features are extracted from the first tile.

10. The method of claim 1, wherein performing the matching procedure comprises transmitting the subset of features to a remote device, and receiving the result from the remote device.

11. The method of claim 1 comprising:
    determining location statistics based on the extracted features of the first tile;
    detecting the extracted features on a lower octave version of the image based on the location statistics; and
    calculating a pose of the object based on the features detected on the lower octave version of the image.

12. An apparatus configured to implement an object detection pipeline, the apparatus comprising:
    a memory unit;
    a processor coupled to the memory unit and configured to:
        determine, while in the object detection pipeline, a number of features within a first tile of an image, wherein the image is divisible into a plurality of tiles;
        perform a matching procedure using at least a subset of the features within the first tile if the number of features within the first tile meets a threshold value;
        exit the object detection pipeline if a result of the matching procedure indicates an object is recognized in the image; and
        store the result of the matching procedure in the memory unit.

13. The apparatus of claim 12 wherein the processor is further configured to extract features from a second tile within the image if the number of features in the first tile does not meet the threshold value.

14. The apparatus of claim 13 wherein the processor is configured to determine a location of a second tile within the image based on a vertical raster pattern.

15. The apparatus of claim 13 wherein the processor is configured to determine a location of the second tile within the image based on a predetermined search pattern.

16. The apparatus of claim 13 wherein the processor is configured to create a downsampled version of the image and determine locations of the first and second tiles within the image based on an image analysis performed on the downsampled version of the image.

17. The apparatus of claim 13 wherein the processor is configured to:
    extract features from an N+1 tile within the image if a cumulative number of features in the N tiles does not meet a threshold value;
    perform the matching procedure using the features extracted from the N+1 tile and the cumulative features extracted from the N tiles if the number of cumulative features from the N tiles and the N+1 tile meets a threshold value; and exit the object detection pipeline if a result of the matching procedure using the cumulative features from the N tiles and the N+1 tile indicates an object is recognized in the image.

18. The apparatus of claim 12 wherein the processor is configured to extract features from a second tile within the image if the results of the matching procedure do not indicate that an object is recognized.

19. The apparatus of claim 12 wherein the processor is configured to determine the pose of a recognized object, and extract features from a second tile within the image if the pose of the recognized object is not geometrically consistent with information in an objects database.

20. The apparatus of claim 12 wherein the processor is configured to downsample the image before the features are extracted from the first tile.

21. The apparatus of claim 12 wherein the processor is configured to perform the matching procedure by transmitting the subset of features to a remote device, and receiving the result from the remote device.

22. The apparatus of claim 12 wherein the processor is configured to:
determine location statistics based on the extracted features of the first tile;
detect the extracted features on a lower octave version of the image based on the location statistics; and
calculate a pose of the object based on the features detected on the lower octave version of the image.

23. The apparatus of claim 12 further comprising a camera configured to capture the image and provide the image to the processor.

24. An apparatus for exiting an object detection pipeline, the apparatus comprising:
means for determining, while in the object detection pipeline, a number of features within a first tile of an image, wherein the image is divisible into a plurality of tiles;
means for performing a matching procedure using at least a subset of the features within the first tile if the number of features within the first tile meets a threshold value;
means for exiting the object detection pipeline if a result of the matching procedure indicates an object is recognized in the image; and
means for storing the result of the matching procedure.

25. The apparatus of claim 24 further comprising means for extracting features from a second tile within the image if the number of features in the first tile does not meet the threshold value.

26. The apparatus of claim 25 further comprising means for determining a location of a second tile within the image based on a vertical raster pattern.

27. The apparatus of claim 25 further comprising means for determining a location of the second tile within the image based on a predetermined search pattern.

28. The apparatus of claim 25 further comprising means for creating a downsampled version of the image and means for determining locations of the first and second tiles within the image based on an image analysis performed on the downsampled version of the image.

29. The apparatus of claim 25 further comprising:
means for extracting features from an N+1 tile within the image if a cumulative number of features in the N tiles does not meet a threshold value;
means for performing the matching procedure using the features extracted from the N+1 tile and the cumulative features extracted from the N tiles if the number of cumulative features from the N tiles and the N+1 tile meets a threshold value; and
means for exiting the object detection pipeline if a result of the matching procedure using the cumulative features from the N tiles and the N+1 tile indicates an object is recognized in the image.

30. The apparatus of claim 24 further comprising means for extracting features from a second tile within the image if the results of the matching procedure do not indicate that an object is recognized.

31. The apparatus of claim 24 further comprising means for determining the pose of a recognized object, and means for extracting features from a second tile within the image if the pose of the recognized object is not geometrically consistent with information in an objects database.

32. The apparatus of claim 24 comprising means for downsampling the image before the features are extracted from the first tile.

33. The apparatus of claim 24 wherein the means for performing the matching procedure comprises means for transmitting the subset of features to a remote device, and means for receiving the result from the remote device.

34. The apparatus of claim 24 comprising:
means for determining location statistics based on the extracted features of the first tile;
means for detecting the extracted features on a lower octave version of the image based on the location statistics; and
means for calculating a pose of the object based on the features detected on the lower octave version of the image.

35. The apparatus of claim 24 comprising means for capturing the image and providing the image to the processor.

36. A non-transitory computer-readable medium having stored thereon instructions that, when executed, cause a processor to:
determine, while in an object detection pipeline, a number of features within a first tile of an image, wherein the image is divisible into a plurality of tiles;
perform a matching procedure using at least a subset of the features within the first tile if the number of features within the first tile meets a threshold value;
exit the object detection pipeline if a result of the matching procedure indicates an object is recognized in the image; and
store the result of the matching procedure.

37. The non-transitory computer-readable medium of claim 36 further comprising instructions to cause the processor to extract features from a second tile within the image if the number of features in the first tile does not meet the threshold value.

38. The non-transitory computer-readable medium of claim 36 further comprising instructions to cause the processor to extract features from a second tile within the image if the results of the matching procedure do not indicate that an object is recognized.

* * * * *